(12) United States Patent
Arnold et al.

(10) Patent No.: US 9,874,292 B2
(45) Date of Patent: Jan. 23, 2018

(54) DIAPHRAGM ACTUATORS HAVING ADJUSTABLE ACTUATION FORCE

(71) Applicant: Fisher Controls International LLC, Marshalltown, IA (US)

(72) Inventors: David Anthony Arnold, Marshalltown, IA (US); Daniel Martin Adams, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 34 days.

(21) Appl. No.: 14/216,125

(22) Filed: Mar. 17, 2014

(65) Prior Publication Data

US 2015/0260306 A1  Sep. 17, 2015

(51) Int. Cl.
*F16K 31/12* (2006.01)
*F16K 31/126* (2006.01)

(52) U.S. Cl.
CPC ...... *F16K 31/1264* (2013.01); *F16K 31/1268* (2013.01)

(58) Field of Classification Search
CPC .................................................. F15K 31/1264
See application file for complete search history.

(56) References Cited

U.S. PATENT DOCUMENTS

| 571,833 | A | * | 11/1896 | Hunter | F16K 31/1262 |
| | | | | | 137/505.22 |
| 3,029,060 | A | * | 4/1962 | Anderson | F16K 31/143 |
| | | | | | 251/14 |
| 3,302,534 | A | * | 2/1967 | Bauer | F02D 9/00 |
| | | | | | 251/61 |
| 3,583,432 | A | * | 6/1971 | Powell | F16K 17/105 |
| | | | | | 137/489 |
| 3,945,302 | A | * | 3/1976 | Downs | 92/13.2 |
| 4,187,817 | A | * | 2/1980 | Wilson et al. | 123/463 |
| 4,350,503 | A | * | 9/1982 | Skoli et al. | 96/162 |
| 6,929,026 | B1 | * | 8/2005 | Arlinghaus, Jr. | 137/505.13 |
| 2006/0127722 | A1 | | 6/2006 | Nakajima et al. | |
| 2009/0278065 | A1 | * | 11/2009 | Grenaway et al. | 251/61 |
| 2013/0042931 | A1 | | 2/2013 | Vasquez et al. | |

(Continued)

FOREIGN PATENT DOCUMENTS

| CN | 201502718 | 6/2010 |
| CN | 202561169 | 11/2012 |
| GB | 1481149 | 7/1977 |

OTHER PUBLICATIONS

Dyna-Flo Control Valve Services Ltd., "Model DF100 Control Valve", Technical Sales Bulletin, Aug. 2011, 8 pages.

(Continued)

*Primary Examiner* — Marina Tietjen
*Assistant Examiner* — Daphne M Barry
(74) *Attorney, Agent, or Firm* — Hanley, Flight & Zimmerman, LLC

(57) ABSTRACT

Diaphragm actuators having adjustable actuation force are disclosed herein. An example apparatus includes a spring seat coupled to a diaphragm of an actuator. The spring seat is to contact a spring and is to be coupled to a stem. The diaphragm is to displace the stem based on a force provided to the diaphragm, and the stem is to control a fluid valve. The example apparatus also includes an adjuster to adjust an amount of force provided to the spring seat by the spring.

24 Claims, 7 Drawing Sheets

(56) References Cited

U.S. PATENT DOCUMENTS

2013/0277596 A1 10/2013 Alman et al.
2013/0306333 A1* 11/2013 Ringer et al. .................. 169/17

OTHER PUBLICATIONS

Emerson Process Management, "Fisher 657 and 667 Diaphragm Actuators", Product Bulletin, May 2012, 16 pages.
Patent Cooperation Treaty, "International Search Report," issued in connection with PCT Application No. PCT/US2015/020910, dated May 18, 2015, 5 pages.
Patent Cooperation Treaty, "Written Opinion," issued in connection with PCT Application No. PCT/US2015/020910, dated May 18, 2015, 5 pages.
Patent Cooperation Treaty, "International Preliminary Report on Patentability," issued in connection with PCT pplication No. PCT/US2015/020910, dated Sep. 20, 2016, 6 pages.

* cited by examiner

DIAPHRAGM ACTUATORS HAVING ADJUSTABLE ACTUATION FORCE

FIELD OF THE DISCLOSURE

This patent relates generally to actuators and, more particularly, to diaphragm actuators having adjustable actuation force.

BACKGROUND

Fluid control valves are commonly distributed throughout process control systems to control flow rates and/or pressures of various fluids (e.g. liquids, gases, etc.). A fluid control valve assembly typically includes a valve body, a stem, and an actuator (e.g., a pneumatic actuator) to displace the valve stem to operate the fluid control valve. Typically, movement of an actuator stem moves the valve stem to position a plug or flow control member within the valve. In the case of a diaphragm actuator, an input pressure (e.g., pressurized gas, fluid, etc.) is applied to a chamber of the actuator to displace the diaphragm. The input pressure necessary to displace the diaphragm is typically defined by multiple parameters including diaphragm and spring selection, tolerances of components, assembly variation, etc. Typically, the flow controlled by the actuator is largely defined by component selection and tolerances, thereby resulting in significant variability in actuation response (e.g., input pressure necessary to actuate the diaphragm actuator). Additionally, the operating flow controlled by the fluid control valve may necessitate adjustments to the actuator over the operating life of the actuator as the flow through the fluid control valve may change (e.g., drift) over time.

SUMMARY

One described example apparatus includes a spring seat coupled to a diaphragm of an actuator. The spring seat is to contact a spring and coupled to a stem. The diaphragm displaces the stem based on a force provided to the diaphragm and the stem is to control a fluid valve. The example apparatus also includes an adjuster to adjust an amount of force provided to the spring seat by the spring.

Another described example apparatus includes a diaphragm of a valve actuator. The diaphragm displaces a stem based on a force provided to the diaphragm and the stem controls a fluid valve. The example apparatus also includes a first spring seat coupled to the diaphragm and an adjuster in contact with a second spring seat opposite the first spring seat. The example apparatus also includes a spring to contact the first spring seat and the second spring seat at opposing ends and a housing having a threaded aperture to receive a threaded portion of the adjuster. The adjuster displaces the second spring seat.

Another described example apparatus includes a valve stem of a fluid actuator to be displaced by a diaphragm based on a force provided to the diaphragm. The diaphragm is coupled to a first spring seat. The first spring seat coupled is to the diaphragm. The example apparatus also includes a second spring seat in contact with an adjuster. The adjuster has a central aperture to receive the valve stem. The example apparatus also includes a spring to contact the first spring seat and the second spring seat at opposing ends and a housing having a threaded central aperture to receive a threaded portion of the adjuster.

Figure 1A:
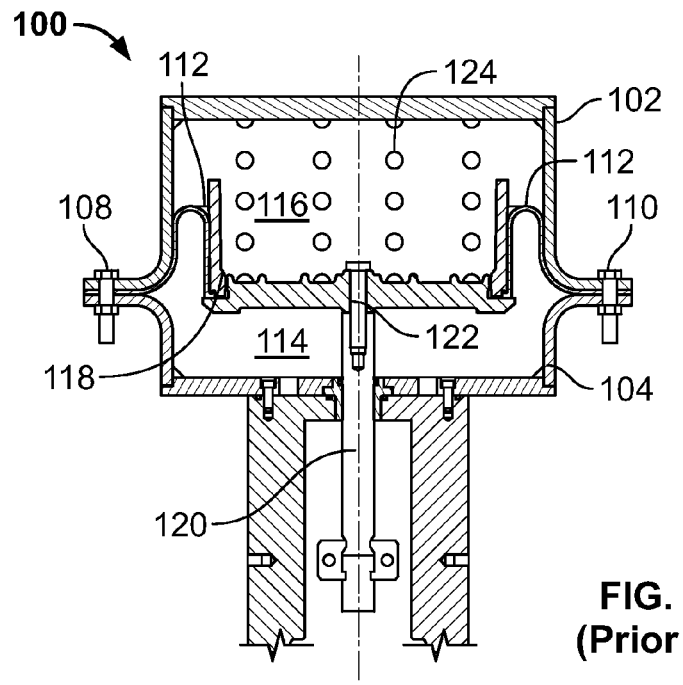
FIG. 1A is a cross-sectional view of a known reverse-acting diaphragm actuator.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Many known diaphragm actuators employ a diaphragm to receive an input force to displace a valve stem, which controls a fluid valve, thereby altering the fluid flow characteristics through the fluid valve. In direct-acting diaphragm actuators, applying an input control pressure from a fluid (e.g., gas, air, etc.) moves the diaphragm to extend the actuator stem. In reverse-acting diaphragm actuators, applying an input control pressure from a fluid (e.g., gas, air, etc.) moves the diaphragm up to retract the actuator stem. Some known diaphragm actuators include a spring to provide (e.g., maintain) a force to the diaphragm to define a desired relationship between the control pressure and actuator stem displacement. This relationship may vary due to factors including spring(s) and/or diaphragm(s) selection, tolerances of the components, variation in manufacturing, etc. The characteristics of the diaphragm actuator may also change with time (e.g., drift, etc.) as the diaphragm actuator is used. Additionally, known diaphragm actuators may expose service/maintenance personnel to a fully or partially loaded spring when the diaphragm actuator is disassembled due to these known systems lacking mechanisms or features to decrease spring load prior the actuator being opened for service and/or maintenance. Some known actuators may allow adjustability via an externally exposed spring. Such exposure to external conditions may be disadvantageous in harsh environmental conditions (e.g., high temperature, highly corrosive, etc.).

The example diaphragm actuators disclosed herein enable adjustment of diaphragm actuation forces with an internally positioned adjustment spring. More specifically, the example apparatus described herein eliminate the need for force adjustments through diaphragm and/or spring replacements, thereby allowing adjustment of the actuation force in the field and/or in a manufacturing setting without exposing the adjustment spring to external conditions, for example. Additionally, the examples disclosed also enable field adjustment to compensate for performance shift (e.g., performance drift, performance variation, etc.) of the example diaphragm actuators. As a result, the examples disclosed herein eliminate the need to stock and/or inventory numerous different springs and/or diaphragms to accommodate different applications, thereby potentially improving profit margins and/or supply chain flexibility. The examples described herein may improve reliability and/or useful life of the adjustment spring by internally positioning the adjustment spring. Reducing the number of unique components by combining multiple configurations into a single Stock Keeping Unit (SKU) reduces inventory complexity and simplifies part number management and Bill of Materials (BOM) tracking. Reductions in SKUs also allows reduction of spare part inventories and complex supply chain management of numerous configurations. Additionally, the examples disclosed herein allow spring load force applied to a diaphragm to be reduced prior to disassembly of the diaphragm actuator to reduce potential exposure of service and/or maintenance staff to a spring under load.

In some examples, a spring may contact a spring seat, which may be coupled to a diaphragm. The spring seat may have an adjuster (e.g., an adjustment knob) to displace the spring seat, thereby changing the spring force applied to the diaphragm and, thus, altering the amount of force needed to displace the diaphragm. To facilitate access to the adjuster, the adjuster may have an access point external to the diaphragm actuator. For example, the access point may be a hex socket to interface with a tool, for example.

In some examples, the diaphragm actuator may have two or more diaphragms coupled to a spring seat. Other examples may have adjustable mechanical stops to limit a range through which the seat spring and/or the diaphragm displaces.

Before describing the example diaphragm actuators mentioned above, a brief description of known diaphragm actuators is provided below in connection with FIGS. 1A, 1B and 2. Turning to FIG. 1A, a cross-sectional view of a diaphragm actuator 100 is provided. The actuator 100 is a reverse-acting (e.g., air-to-open) diaphragm actuator, which includes an upper casing (e.g., housing) 102 coupled to a lower casing (e.g., housing) 104 with a plurality of fasteners (e.g., screws, bolts, rivets etc.) 108, 110 spaced along an exterior edge of the casings 102 and 104 in a conventional manner. A diaphragm 112 separates the space within the casings 102, 104 into a control pressure chamber 114 and an atmospheric pressure chamber 116. The diaphragm 112 is coupled at an end of the diaphragm 112 to a spring seat 118 and positioned (e.g., captured, retained) by the casings 102, 104. In some examples, the fasteners 108, 110 may pass through respective apertures of the diaphragm 112. The spring seat 118 is coupled to an actuator stem 120 via a fastener 122. In the illustrated example, the actuator stem 120 is to be coupled to a stem of a fluid control valve. In particular, displacement of the actuator stem 120 moves the valve stem to vary a fluid flow in the fluid control valve by positioning or moving a plug or flow control member of the fluid control valve.

In operation, displacement of the actuator stem 120 occurs in response to an input pressure in the control pressure chamber 114. The input pressure displaces the diaphragm 112 of the illustrated example in an upward direction in the orientation shown in FIG. 1A. In particular, the input pressure displaces at least a portion of the diaphragm 112 when the input pressure applied to the control pressure chamber 114 produces a force on the diaphragm 112 that exceeds a spring force provided by a spring 124. The upward movement of the diaphragm 112 and, thus, the spring seat 118, in turn, moves the stem 120 and any valve stem coupled thereto upward, thereby changing the flow of fluid through a fluid valve.

In the illustrated example, the amount of force needed to displace the diaphragm 112 is affected by spring selection, tolerances, compression distances of the spring, and/or elasticity of the diaphragm 112, etc.

Figure 1B:
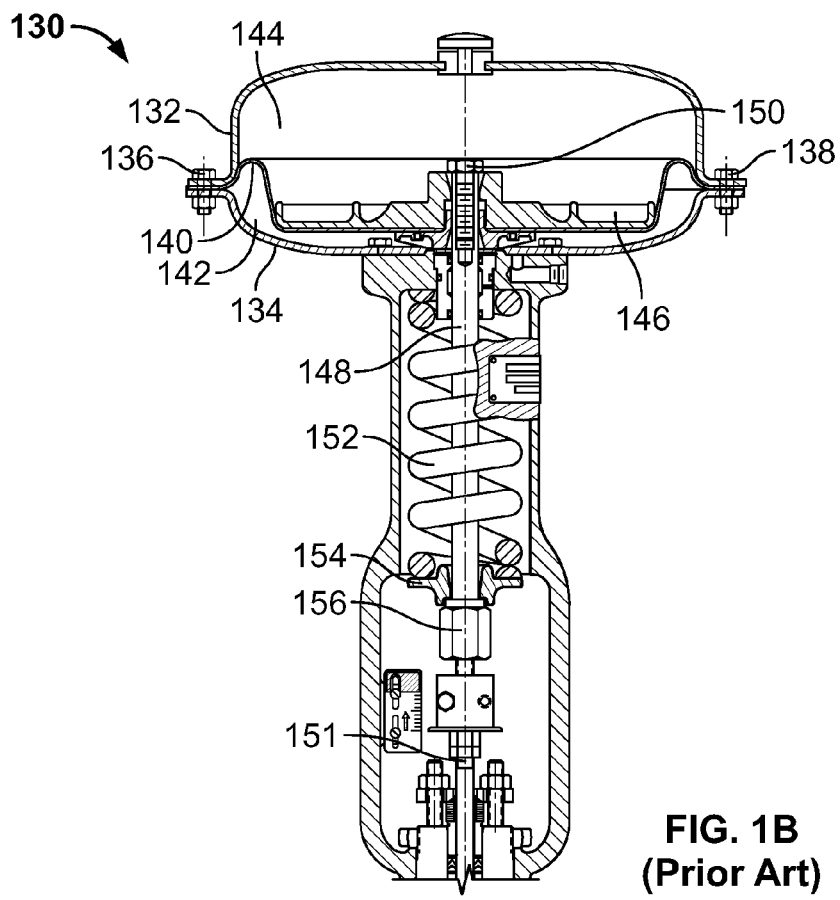
FIG. 1B is a cross-sectional view of another known reverse-acting diaphragm actuator, which has an adjustable spring.

FIG. 1B illustrates a cross-sectional view of another known reverse-acting diaphragm actuator 130. The actuator 130 includes an upper casing 132 coupled to a lower casing 134 with a plurality of fasteners (e.g., screws, bolts, rivets etc.) 136, 138 spaced along an exterior edge of the casings 132 and 134 in a conventional manner. A diaphragm 140 separates the space within the casings 132, 134 into a control pressure chamber 142 and an atmospheric pressure chamber 144. The diaphragm 140 is coupled at an end of the diaphragm 140 to a diaphragm plate 146 and positioned (e.g., captured, retained) by the casings 132, 134. In some examples, the fasteners 136, 138 may pass through respective apertures of the diaphragm 140. The diaphragm plate 146 is coupled to an actuator stem 148 via a fastener 150. In the illustrated example, the actuator stem 148 is to be coupled to a valve stem 151 of a fluid control valve. In particular, displacement of the actuator stem 148 moves the valve stem 151 to vary a fluid flow in the fluid control valve by positioning or moving a plug or flow control member of the fluid control valve. In this example, a force provided to the diaphragm plate 146 by a spring 152 may be adjusted via a spring seat 154 (e.g., displacing the spring seat 154 relative to the lower casing 134). The spring seat 154 may be displaced via a spring adjuster 156, which may be rotated to displace the spring seat 154. In the illustrated example, the spring 152 is externally exposed.

In operation, displacement of the actuator stem 148 occurs in response to an input pressure in the control pressure chamber 142. The input pressure displaces the diaphragm 140 of the illustrated example in an upward direction in the orientation shown in FIG. 1B. In particular, the input pressure displaces at least a portion of the diaphragm 140 when the input pressure applied to the control pressure chamber 142 produces a force on the diaphragm 140 that exceeds a force provided by a spring 152. The upward movement of the diaphragm 140 and, thus, the diaphragm plate 146 moves the stem 148 and the valve stem 151 upward, thereby changing the flow of fluid through the fluid valve.

Figure 2:
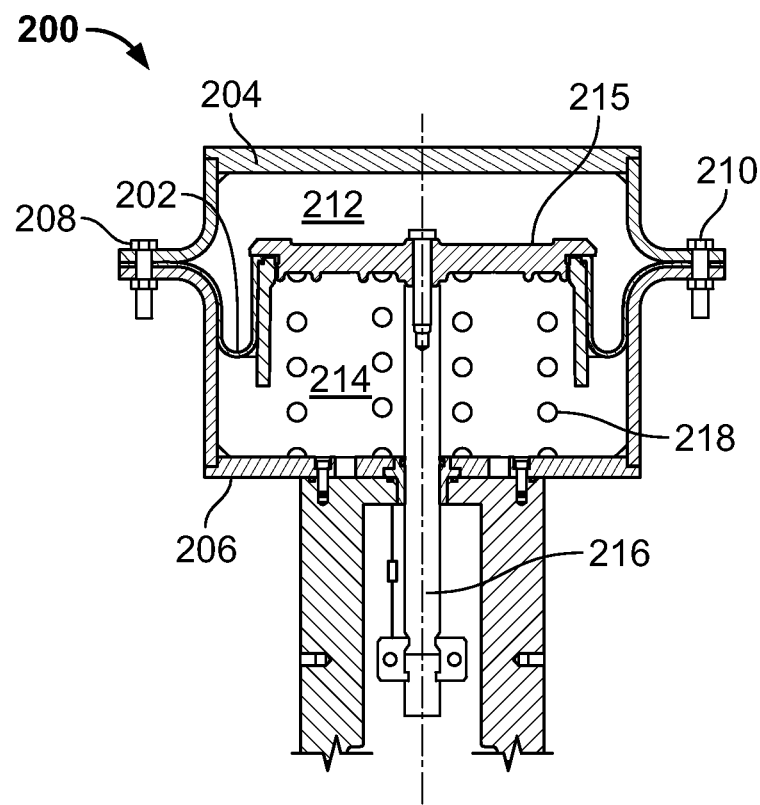
FIG. 2 is a cross-sectional view of a known direct-acting diaphragm actuator.

FIG. 2 illustrates a cross-sectional view of another known diaphragm actuator 200, which is direct-acting (e.g., air-to-close). Similar to the diaphragm actuators 100, 130 shown above in connection with FIGS. 1A and 1B, a peripheral edge of a diaphragm 202 is positioned (e.g., captured) between an upper casing 204 and a lower casing 206. In the illustrated example, the upper casing 204 is coupled to the lower casing 206 with a plurality of fasteners (e.g., screws, bolts, rivets etc.) 208, 210 spaced along an exterior edge of the casings 204, 206 in a conventional manner and, in some examples, the fasteners 208, 210 may extend through respective apertures of the diaphragm 202 near a peripheral edge of the diaphragm 202. The diaphragm 202 is captured between the casings (e.g., housings) 204, 206 and separates the space within the casings 204, 206 into a control pressure chamber 212 and an atmospheric pressure chamber 214. The diaphragm 202 is coupled to a spring seat 215 at a central portion of the diaphragm 202. In the illustrated example, a stem 216 is coupled to the spring seat 215 and moves with the spring seat 215 to control a fluid valve. In particular, the stem 216 is coupled to a stem of the fluid valve to move a plug or fluid control member of the fluid valve to vary a fluid flow therethrough.

In operation, displacement of the actuator stem 216 of the illustrated example occurs in response to an input pressure being provided into the control pressure chamber 212. The input pressure displaces the diaphragm 202 in a downward direction in the orientation shown in FIG. 2. In particular, the input pressure displaces at least a portion of the diaphragm 202 when the input pressure is applied to the control pressure chamber 212, thereby displacing the spring seat 215 downward and, thus, counteracting a spring force provided by a spring 218. The downward movement of the spring seat 215, in turn, displaces the actuator stem 216 downward. Similar to the actuators 100, 130 the force needed to displace the diaphragm 202 is affected by spring selection, tolerances, compression distances of the spring, elasticity of the diaphragm 202, etc.

Figure 3:
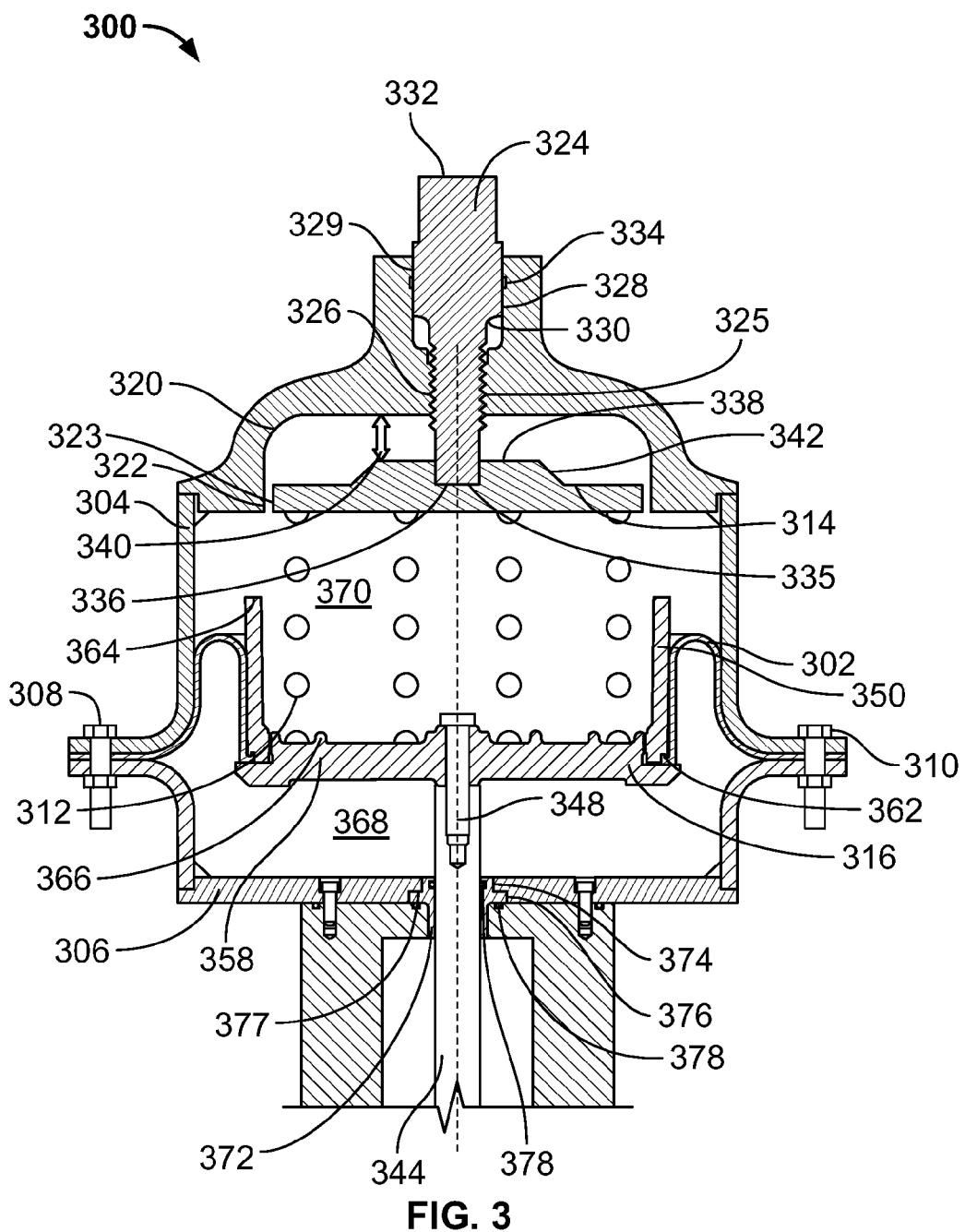
FIG. 3 is a cross-sectional view of an example reverse-acting diaphragm actuator in accordance with the teachings of this disclosure.

FIG. 3 is a cross-sectional view of an example actuator 300 in accordance with the teachings of this disclosure. The example actuator 300 of FIG. 3 is reverse-acting (e.g., air-to-open). With reference to FIG. 3, a diaphragm 302 is positioned (e.g., captured) between an upper casing 304 and a lower casing 306 with a plurality of fasteners 308, 310.

A spring 312 of the illustrated example is positioned (e.g., captured, encased, etc.) internally within the actuator 300 and between an upper spring seat 314 and a lower spring seat 316. In the illustrated example, the upper spring seat 314, which contacts (e.g., engages) a first end of the spring 312, is disposed within a recess 320 of the upper casing 304. The recess 320 of the upper casing 304 may be used to align the upper spring seat 314 via a wall 322 that may contact and/or align a peripheral edge 323 of the upper spring seat 314. An adjuster 324 of the illustrated example is in contact with the upper spring seat 314. In the illustrated example, the upper casing 304 has a threaded aperture 325 to threadably engage a threaded portion 326 of the adjuster 324. The upper casing 304 of the illustrated example also has an aperture 328 to receive a portion 329 of the adjuster 324, which has a recess 330 to define a gap in which the adjuster 324 may displace relative to the upper casing 304. Such a gap may apply to any of the examples disclosed herein. In some examples, the adjuster 324 may have an aperture 332 to receive a tool. The aperture 332 may be hex shaped or any other appropriate shape to receive the tool. In the illustrated example, the aperture 332 is externally accessible. In some examples, the tool may alternatively or additionally be used to engage and/or contact an external surface (e.g., flats or other feature) of the adjuster 324. The aperture 328 of the illustrated example, in some examples, includes a seal cavity 334 to receive an O-ring or gasket, for example, to seal the adjuster 324 to the upper casing 304.

The adjuster 324 may have a bearing surface 335 to position and/or contact a recess 336 of the upper spring seat 314. The bearing surface 335 of the illustrated example allows the upper spring seat 314 to remain relatively stationary (e.g., does not rotate) as the adjuster 324 is rotated. While contact with the bearing surface 335 is shown, any appropriate type of contact may be used, including but not limited to a bearing interface (e.g., ball bearing), a rotating joint, etc. Alternatively, the adjuster 324 may be coupled to the upper spring seat 314 via welding, adhering, or any other appropriate manufacturing process.

In some examples, the upper casing 304 may engage and/or restrict a surface of the upper spring seat 314 such as a surface 338, for example, to further align and/or constrain the upper spring seat 314. A gap depicted by an arrow 340 depicts a distance the upper spring seat 314 may move in a longitudinal direction relative to the upper casing 304. In some examples the upper casing 304 may have a contour to matably receive a surface 342 (e.g., annular surface, annular bevel, etc.) of the upper spring seat 314.

The lower spring seat 316 of the illustrated example is coupled to an actuator stem 344 via a fastener 348. In the illustrated example, the lower spring seat 316 contacts (e.g., engages) a second end of the spring 312. In the illustrated example, the lower spring seat 316 has a side wall 350 and a plate 358 coupled together to constrain the spring 312 from side-to-side or lateral displacement. In some examples, the diaphragm 302 may have a tab or lip 362 to be retained by the side wall 350 and/or the plate 358. The lower spring seat 316 of the illustrated example sealingly engages the diaphragm 302 at an interface between the side wall 350 and the plate 358. The side wall 350 of the illustrated example also has an edge 364 to contact the upper casing 304, thereby limiting the range of motion or displacement of the lower spring seat 316 relative to the upper casing 304. Additionally or alternatively, in some examples, the edge 364 may limit the displacement of the lower spring seat 316 by contacting upper spring seat 314.

In some examples, the lower spring seat 316 and/or the upper spring seat 314 may have protrusions (e.g., annular or ring-shaped protrusions) 366 to further constrain the spring 312 (e.g., prevent or reduce side-to-side motion of the spring 312). Additionally or alternatively, other biasing elements may be used (e.g., fluid bladders, etc.). The actuator 300 may have a single spring or multiple springs between the lower spring seat 316 and the upper seat 314. Multiple springs may be arranged in a concentric pattern or may be arranged in a non-concentric pattern. Employing multiple springs may allow increased compactness of the actuator 300 (e.g., higher spring force per displacement) and/or greater redundancy, etc.

In operation, an input pressure may be provided to a control pressure chamber 368 to displace the diaphragm 302 and the lower spring seat 316 against the force of the spring 312 to move the lower spring seat 316 in an upward direction in the orientation of FIG. 3. A chamber 370 of the illustrated example may be at atmospheric pressure or at another defined pressure to provide a pressure differential relative to the control pressure chamber 368.

The upward motion of the lower spring seat 316, in turn, displaces the stem 344 upward along a central axis defined by a bushing 372 in the lower casing 306. The bushing 372 of the illustrated example has annular walls 374, 376, which define a stepped profile or flange to couple and/or engage a corresponding stepped profile 377 of the lower casing 306. In some examples, the lower casing and/or the bushing 372 may have seal cavities 378 to seal the control pressure chamber 368 along interfaces defined by the bushing 372 and/or the lower casing 306 near the actuator stem 344.

The amount of spring force counteracting the input force applied via a control pressure in the lower chamber 368 may be varied by displacing the adjuster 324 and, in turn, displacing the upper spring seat 314. To adjust the force applied to the diaphragm 302 by the spring 312, the adjuster 324 is rotated to displace the adjuster 324 to displace relative to the upper casing 304 and, therefore, adjust the amount of force provided to the lower spring seat 316 and/or the diaphragm 302 by the spring 312.

In other words, the adjuster 324 allows the amount of force counteracting the input force provided to the diaphragm 302 via the control pressure chamber 368 to be adjusted (e.g., customized or tuned to specific applications and/or adjusted to precise operating specifications, etc.) and may also be used to decrease compression force of the spring 312 prior to disassembly of the upper casing 304 from the actuator 300 during servicing or maintenance operations to, for example, prevent service personnel from exposure to a fully or partially loaded spring during servicing of the actuator 300. The amount of force applied to the diaphragm 302 via displacement of the upper spring seat 314 may be adjusted in the field and/or fine-tuned to satisfy specific applications. As mentioned above, a gap depicted by the double arrow 340 indicates the range over which the upper spring seat 314 may move within the recess 320. In contrast to the known actuators 100, 130, 200, the example actuator 300 allows adjustment of the spring force applied to the diaphragm 302 via adjustment (e.g., alteration) of the compression of the spring 312 while positioning the spring 312 internally to prevent exposure of the spring 312 to external conditions. This allows a wide range of adjustability while eliminating the requirement for tight tolerances of parts, fits, etc. and/or components specific to varying applications while potentially increasing useful life of the spring 312.

Figure 4:
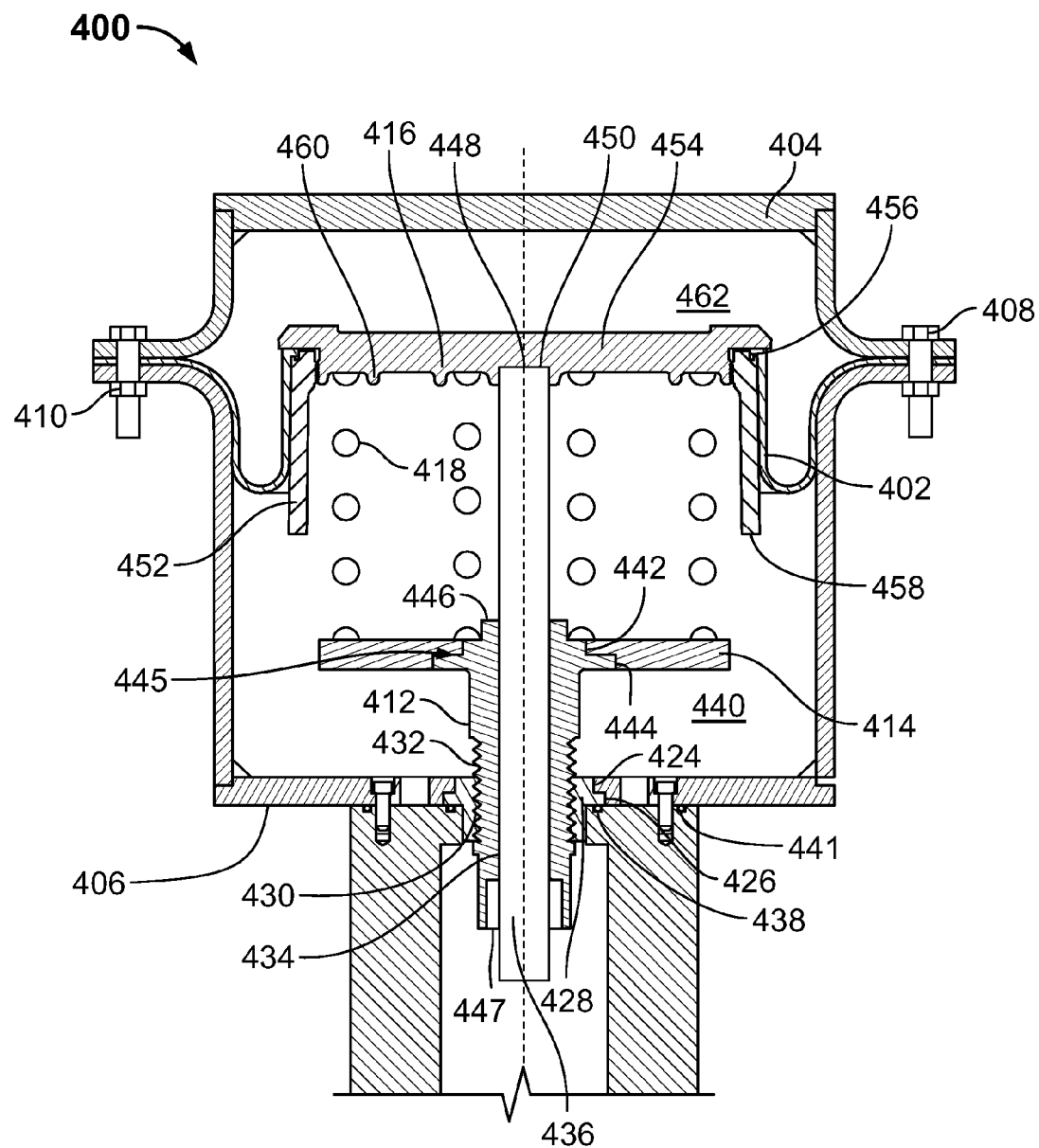
FIG. 4 is a cross-sectional view of an example direct-acting diaphragm actuator.

FIG. 4 is a cross-sectional view of an example direct-acting (e.g., air-to-close) actuator 400. As depicted in FIG. 4, a diaphragm 402 is positioned (e.g., captured) between an upper casing 404 and a lower casing 406 with a plurality of fasteners 408, 410 that, in some examples, may pass through respective apertures of the diaphragm 402. In contrast to the actuator 300 described in connection with FIG. 3, an adjuster 412 is in contact with a lower spring seat 414 instead of an upper spring seat 416.

In the illustrated example, a spring 418 is positioned (e.g., captured) internally within the actuator 400 and between the lower spring seat 414 and the upper spring seat 416. In the illustrated example, the lower spring seat 414 contacts (e.g., engages) a first end of the spring 418 and is disposed within the lower casing 406. In the illustrated example, the lower casing 406 has annular surfaces 424, 426 defining a stepped profile to accept an insert 428 having a threaded aperture 430 and a corresponding stepped profile to contact the surfaces 424, 426 of the lower casing 406. In the illustrated example, the threaded aperture 430 of the insert 428 engages threads 432 of the adjuster 412, which has a central aperture 434 to accept a stem 436. The stem 436 of the illustrated example moves along a central bore defined by the central aperture 434. Alternatively, in some examples, the insert 428 is integral with the lower casing 406. In examples where a differential pressure is applied to a chamber 440 (i.e., as opposed to the chamber 440 being at atmospheric pressure), a seal 438, which may be an O-ring or gasket, substantially prevents leaking from the chamber 440 to an external environment of the actuator 400. Additionally or alternatively, in such examples, a seal 441, which may be an O-ring or a gasket, in some examples, seals the chamber 440.

The adjuster 412 may have bearing surfaces 442, 444 defining a stepped profile to contact a corresponding stepped profile 445 of the lower spring seat 414. The bearing surfaces 442, 444 of the illustrated example allow the lower spring seat 414 to remain relatively stationary (e.g., does not rotate) as the adjuster 412 is rotated. The adjuster 412 of the illustrated example also has a protrusion (e.g., wall) 446 to constrain or prevent lateral movement of the spring 418.

While contact via the bearing surfaces 442, 444 is shown, any appropriate type of contact between the adjuster 412 and the lower spring seat 414 may be used including, but not limited to a bearing interface (e.g., ball bearing), etc. Alternatively, the adjuster 412 may be coupled to the lower spring seat 414 by welding, adhering, or any other appropriate manufacturing process. Additionally or alternatively, the adjuster 412 may have an aperture 447 to receive a tool. The aperture 447 may be externally accessible and hex shaped or any other appropriate shape to receive the tool. In some examples, the tool may contact an external surface (e.g., outer surface) of the adjuster 412. The stem 436 of the illustrated example is coupled to the upper spring seat 416 via contact between a surface 448 of the stem 436 and a surface 450 of the upper spring seat 416. In other examples, the stem 436 may not be coupled to the upper spring seat 416 and may, instead, only contact the upper spring seat 416 (e.g., the stem 436 is displaced by bearing surface contact of the upper spring seat 416 to the valve stem 436).

In the illustrated example, the upper spring seat 416 contacts (e.g., engages) a second end of the spring 418. In this example, the upper spring seat 416 has a side wall 452 and/or a plate 454 to define an interface to constrain the spring 418 from side-to-side or lateral displacement. The side wall 452 and/or the plate 454 of the illustrated example also sealingly engage the diaphragm 402 at the interface defined by the side wall 452 and/or the plate 454. More specifically, in this example, the side wall 452 and the plate 454 constrain a tab or lip 456 of the diaphragm 402. The side wall 452 of the illustrated example also has an edge 458 to contact the lower casing 406, thereby restricting (e.g., limiting) the range of motion of the upper spring seat 416. Additionally or alternatively, in some examples, the edge 458 may limit the range of motion of the upper spring seat 416 by contacting the lower spring seat 414.

In some examples, the lower spring seat 414 and/or the upper spring seat 416 may have protrusions (e.g., annular ring-shaped protrusions) 460 to further constrain the spring 418 (e.g., prevent side-to-side or lateral motion of the spring 418). Alternatively, other biasing elements may be used instead of springs (e.g., fluid bladders, etc.). The actuator 400 may have a single spring or multiple springs between the lower spring seat 414 and the upper spring seat 416. Multiple springs may be arranged in a concentric pattern or may be arranged in a non-concentric pattern. Employing multiple springs may allow compactness of the actuator 400 (e.g., higher spring force per displacement) and/or greater redundancy, etc.

In operation, an input pressure may be provided at a control pressure chamber 462 to displace the diaphragm 402 and the upper spring seat 416 against the force of the spring 418. The force applied to the diaphragm 402 via the pressurized fluid in the control pressure chamber 462 displaces the upper spring seat 416 and, thus, the stem 436 in a downward direction in the orientation of FIG. 4.

The amount of spring force counteracting the input force applied to the diaphragm 402 via the control pressure chamber 462 may be varied by rotating the adjuster 412 and, in turn, thereby moving the lower spring seat 414 relative to the lower casing 406. Like the actuator 300 described in connection with FIG. 3, the positioning of the spring 312 internally prevents exposure of the spring 312 to external conditions.

Figure 5:
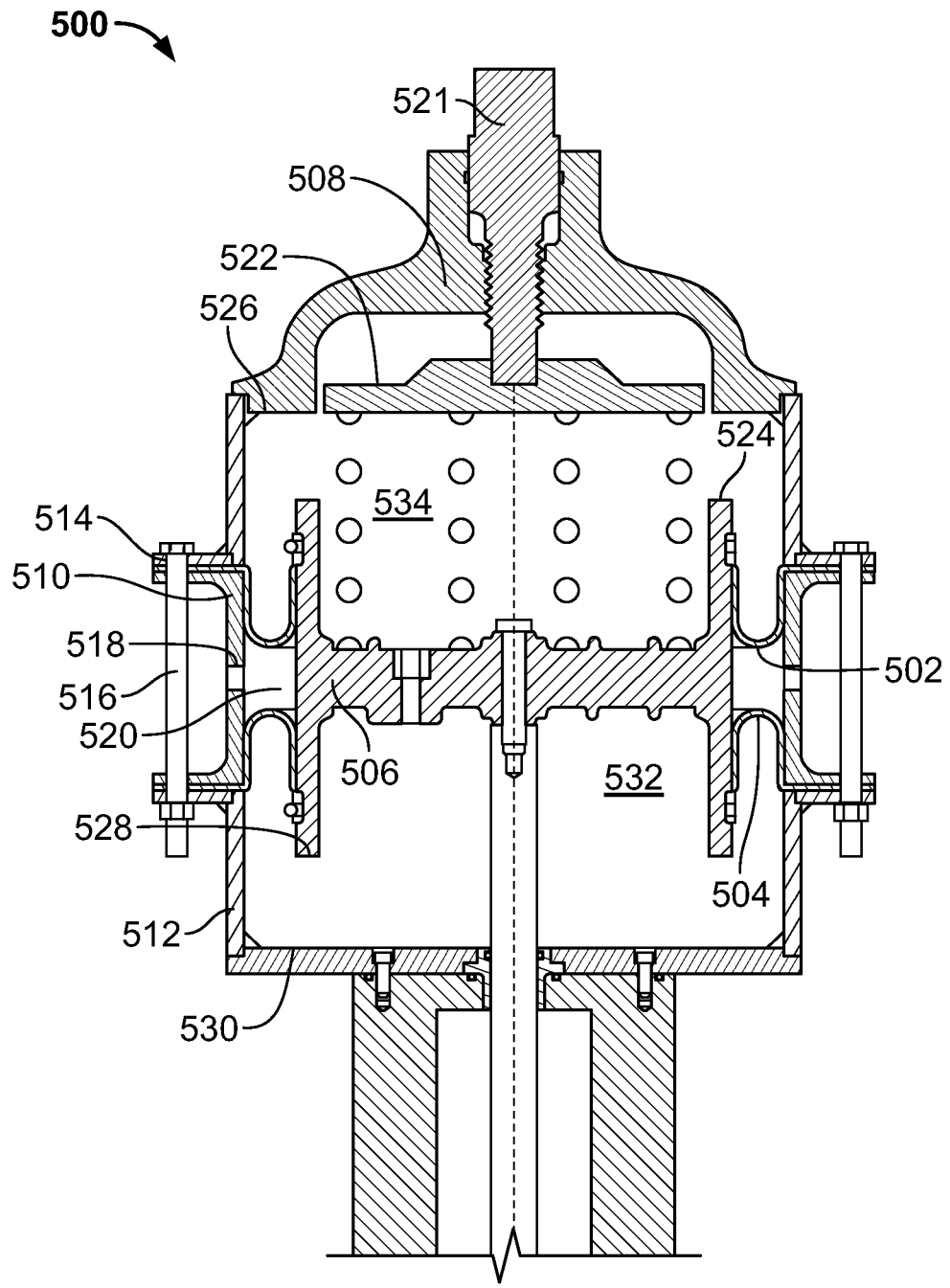
FIG. 5 is a cross-sectional view of another example double-acting diaphragm spring-to-extend actuator.

FIG. 5 is a cross-sectional view of an example double-acting (e.g., spring-to-extend) diaphragm actuator 500, which has dual diaphragms. While similar to the diaphragm actuator 300 described in connection with FIG. 3, the diaphragm actuator 500 has two diaphragms 502, 504 coupled to a lower spring seat 506 instead of a single diaphragm. The first diaphragm 502 of the illustrated example is positioned (e.g., captured) between an upper casing 508 and a retainer 510. Likewise, the second diaphragm 504 is captured between a lower casing 512 and the retainer 510. In the illustrated example, the upper casing 508, the lower casing 512 and/or the retainer 510 have apertures 514 to allow a plurality of fasteners (e.g., screws, rivets, bolts, etc.) 516 to couple the upper casing 508, the lower casing 512 and/or the retainer 510 together. In some examples, the retainer 510 may have an aperture 518 to allow a cavity 520 to be at a substantially atmospheric pressure and/or the pressure external to the actuator 500.

Similar to the diaphragm actuator 300, an adjuster 521 is in contact with an upper spring seat 522 and a force provided to the lower spring seat 506 and/or the diaphragms 502, 504 is adjustable by turning the adjuster 521 to displace the upper spring seat 522 relative to the lower spring seat 506. The lower spring seat 506 of the illustrated example has an edge 524 to contact a surface 526 of the upper casing 508 and, likewise, an edge 528 to contact a surface 530 of the lower casing 512. Such edge contacts limit the travel of the lower spring seat 506 in opposing directions. In some examples, the edge 524 contacts the upper spring seat 522 to limit the travel of the lower spring seat 506. Alternatively, another spring may be present in an input pressure chamber 532 positioned (e.g., captured) between the lower spring seat 506 and the lower casing 512.

Actuators with multiple diaphragms have a relatively longer operational life in comparison to piston actuators utilizing a dynamic o-ring. Actuators with multiple diaphragms may be stroked up and down at a relatively quick rate (i.e., improved dynamic performance) because spring force is not solely relied upon to provide an opposing return displacement. In some examples, additional spring seat force is provided to the lower spring seat 506 when a chamber 534 is supplied with pressure.

Figure 6:
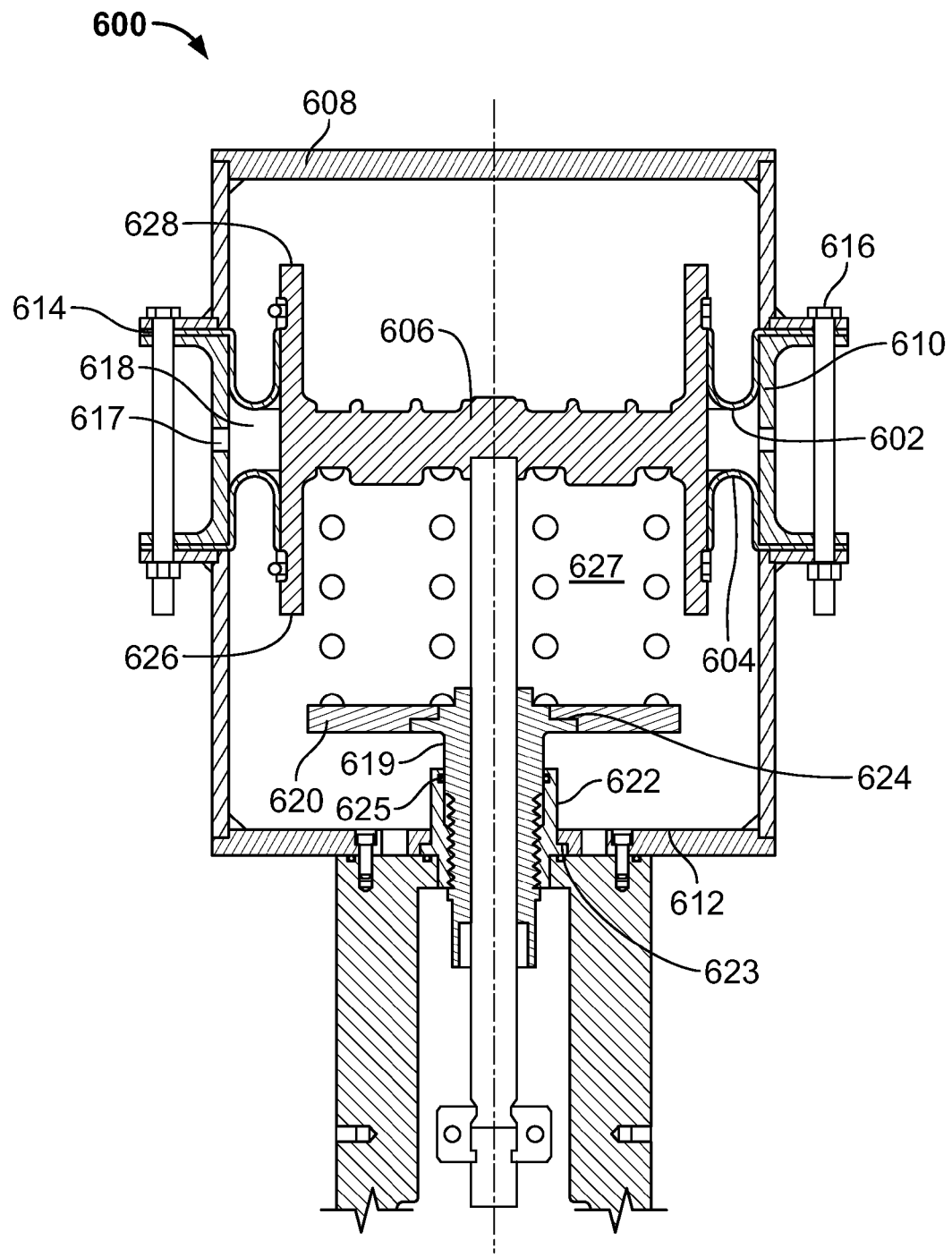
FIG. 6 is a cross-sectional view of another example double-acting diaphragm spring-to-retract actuator.

FIG. 6 is a cross-sectional view of an example double-acting (e.g., spring-to-retract) diaphragm actuator 600, which has dual diaphragms. The diaphragm actuator 600 of the illustrated example has two diaphragms 602, 604 coupled to an upper spring seat 606. Similar to the dual diaphragm actuator 500, the first diaphragm 602 is coupled between an upper casing 608 and a retainer 610. Likewise, the second diaphragm 604 is coupled between a lower casing 612 and the retainer 610. In the illustrated example, the upper casing, 608, the lower casing 612 and/or retainer 610 have apertures 614 to allow a plurality of fasteners (e.g., screws, rivets, bolts, etc.) 616 to couple the upper casing 608, the lower casing 612 and/or the retainer 610 together. In some examples, the retainer 610 may have an aperture 617 to allow a cavity 618 to be at a substantially atmospheric pressure and/or the pressure external to the actuator 600.

Similar to the diaphragm actuator 400 of FIG. 4, an adjuster 619 is in contact with a lower spring seat 620 and a force provided to the lower spring seat 620 and/or the diaphragms 602, 604 is adjustable by turning the adjuster 619 to displace the lower spring seat 620 relative to the upper spring seat 606. In the illustrated example, an insert 622, which is coupled the lower casing 612 via a stepped profile 623, has a second stepped profile 624 to contact the lower spring seat 620 to allow the lower spring seat 620 to remain relatively stationary (e.g., does not rotate) as the adjuster 619 is rotated. The insert 622 of the illustrated example has a seal gland 625 to receive an O-ring or gasket to seal the insert 622 to the adjuster 619 as the adjuster 619 moves relative to the insert 622 (i.e., the O-ring or gasket in the seal gland 625 seals a cavity 627). Additionally, another spring may be positioned (e.g., captured) between the upper spring seat 606 and the upper casing 608. The upper spring seat 606 of the illustrated example has an edge 626 to limit the range of motion or displacement of the upper spring seat 606 relative the lower casing 612. Likewise, the upper spring seat 606 of the illustrated example has an edge 628 to limit the range motion or displacement of the upper spring seat 606 relative to the upper casing 608.

As mentioned above in connection with FIG. 5, actuators with multiple diaphragms have a relatively longer operational life in comparison to piston actuators utilizing a dynamic O-ring.

Figure 7:
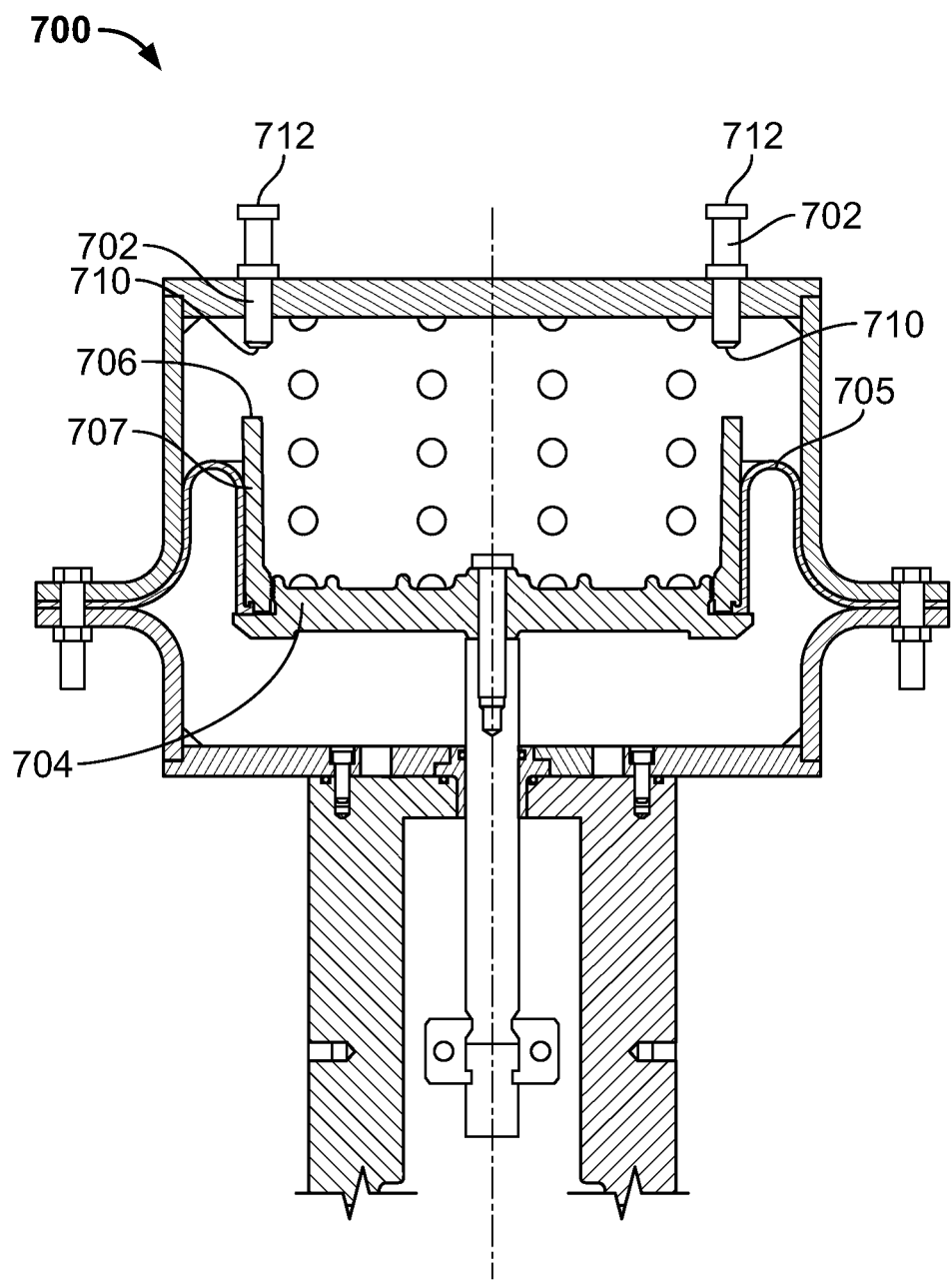
FIG. 7 is a cross-sectional view of another example reverse-acting diaphragm actuator that has adjustable stops to limit travel of a spring seat.

FIG. 7 is a cross-sectional view of another example diaphragm actuator 700 in a reverse-acting (e.g., air-to-open) configuration that has adjustable travel stops 702 to limit travel of a spring seat 704. In the illustrated example, the range of motion of the spring seat 704 and/or a diaphragm 705 is limited by an edge 706 of the side walls 707 contacting stopping surfaces 710 of the adjustable travel stops 702 as the spring seat 704 moves towards the stops 702. The position of the stopping surfaces 710 of the stops 702 may be adjusted by rotating a bolt 712, which may be turned by a wrench, or any other appropriate method. While the adjustable travel stops 702 are shown in conjunction with the actuator 700, they may be applied to any of the examples described herein.

Although certain example apparatus have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. An apparatus comprising:
a spring seat coupled to a diaphragm of an actuator, the spring seat to contact a spring and to be coupled to a stem, the diaphragm to displace the stem based on a force provided to the diaphragm, the stem to control a fluid valve, the spring seat having adjacent first and second annular recesses with different diameters to define a first stepped profile, wherein the spring seat has a first thickness, and wherein the first and second annular recesses have second and third thicknesses, respectively, the first thickness encompassing the second and third thicknesses; and
an adjuster to adjust an amount of force provided to the spring seat by the spring, the adjuster having adjacent third and fourth annular recesses with different diameters to define a second stepped profile to engage the first stepped profile, the adjuster including a second spring seat to contact the spring on an end of the spring opposite the spring seat, the spring seat having an edge to limit the range of motion of the spring seat relative to the second spring seat.

2. The apparatus as defined in claim 1, wherein the adjuster displaces the spring seat.

3. The apparatus as defined in claim 2, wherein the adjuster contacts the spring seat via a bearing surface on the spring seat.

4. The apparatus as defined in claim 2, wherein the adjuster is fixed to the spring seat.

5. The apparatus as defined in claim 1, wherein the adjuster is to receive a tool.

6. The apparatus as defined in claim 1, further comprising a second diaphragm coupled to the spring seat.

7. The apparatus as defined in claim 1, further comprising an adjustable travel stop to stop the spring seat.

8. The apparatus as defined in claim 7, wherein the adjustable travel stop is mounted to a housing of the actuator.

9. The apparatus as defined in claim 1, further including a seal disposed within a seal gland to seal a housing of the actuator to the adjuster.

10. An apparatus comprising:
a spring seat coupled to a diaphragm of an actuator, the spring seat to contact a spring and to be coupled to a stem, the diaphragm to displace the stem based on a force provided to the diaphragm, the stem to control a fluid valve, the spring seat having adjacent first and second annular recesses with different diameters to define a first stepped profile, wherein the spring seat has a first thickness, and wherein the first and second annular recesses have second and third thicknesses, respectively, the first thickness encompassing the second and third thicknesses; and
an adjuster that is operated from outside the actuator, the adjuster to adjust an amount of force provided to the spring seat by the spring, the adjuster having adjacent third and fourth annular recesses with different diameters to define a second stepped profile to engage the first stepped profile.

11. The apparatus as defined in claim 10, wherein the adjuster includes a second spring seat, the second spring seat to contact the spring on an end of the spring opposite the spring seat.

12. The apparatus as defined in claim 11, wherein the spring seat includes an edge to limit the range of motion of the spring seat relative to the second spring seat.

13. An apparatus comprising:
a diaphragm of a valve actuator, the diaphragm to displace a stem based on a force provided to the diaphragm, the stem to control a fluid valve;
a first spring seat coupled to the diaphragm;
an adjuster in contact with a second spring seat, the second spring seat having adjacent first and second annular recesses with different diameters to define a first stepped profile, the adjuster having adjacent third and fourth annular recesses with different diameters to define a second stepped profile to engage the first stepped profile, wherein the second spring seat has a first thickness, and wherein the first and second annular recesses have second and third thicknesses, respectively, the first thickness encompassing the second and third thicknesses;
a housing having a threaded aperture to receive a threaded portion of the adjuster, wherein the adjuster displaces the second spring seat to adjust an amount of force provided to the diaphragm by a spring; and
a seal disposed within a seal gland to seal the housing to the adjuster.

14. The apparatus as defined in claim 13, wherein the housing comprises a recess to align the second spring seat.

15. The apparatus as defined in claim 13, wherein the adjuster is externally accessible.

16. The apparatus as defined in claim 15, wherein the adjuster is to receive a tool.

17. The apparatus as defined in claim 13, further comprising an adjustable travel stop.

18. An apparatus comprising:
a valve stem of a fluid actuator to be displaced by a diaphragm based on a force provided to the diaphragm, the diaphragm coupled to a first spring seat;
a second spring seat in contact with an adjuster, the adjuster to have a central aperture to receive the valve stem, the second spring seat having adjacent first and second annular recesses with different diameters to define a first stepped profile, the adjuster having adjacent third and fourth annular recesses with different diameters to define a second stepped profile to engage the first stepped profile, wherein the second spring seat comprises an edge to limit the range of motion of the second spring seat relative to the first spring seat, wherein the edge is to contact an adjustable travel stop, and wherein the adjustable travel stop is to be adjusted to vary the range of motion of the second spring seat relative to the first spring seat; and
a housing having a threaded central aperture to receive a threaded portion of the adjuster, wherein the adjuster displaces the second spring seat to adjust an amount of force provided to the diaphragm by a spring.

19. The apparatus as defined in claim 18, further comprising an adjustable travel stop.

20. The apparatus as defined in claim 18, further including a seal disposed within a seal gland to seal a housing of the actuator to the adjuster.

21. An apparatus comprising:
a spring seat coupled to a first diaphragm of an actuator, the spring seat to contact a spring and to be coupled to a stem, the first diaphragm to displace the stem based on a force provided to the first diaphragm, the stem to control a fluid valve, the spring seat having adjacent first and second annular recesses with different diameters to define a first stepped profile;
a second diaphragm coupled to the spring seat; and
an adjuster to adjust an amount of force provided to the spring seat by the spring, the adjuster having adjacent third and fourth annular recesses with different diameters to define a second stepped profile to engage the first stepped profile.

22. The apparatus as defined in claim 21, further including a retainer disposed between the first and second diaphragms.

23. The apparatus as defined in claim 22, wherein the retainer includes a flange to receive a fastener.

24. The apparatus as defined in claim 22, wherein the retainer includes an external aperture to define an external pressure volume between the first and second diaphragms.

* * * * *